(12) United States Patent
Badger et al.

(10) Patent No.: US 9,278,640 B2
(45) Date of Patent: Mar. 8, 2016

(54) CONVERTIBLE UTILITY/CAMPER UNIT FOR USE IN TRAILER OR TRUCK BED

(71) Applicants: William A. Badger, Salt Lake City, UT (US); Robert J. T. Badger, Salt Lake City, UT (US); John T. Badger, Salt Lake City, UT (US)

(72) Inventors: William A. Badger, Salt Lake City, UT (US); Robert J. T. Badger, Salt Lake City, UT (US); John T. Badger, Salt Lake City, UT (US)

(*) Notice: Subject to any disclaimer, the term of this patent is extended or adjusted under 35 U.S.C. 154(b) by 0 days.

(21) Appl. No.: 14/476,625

(22) Filed: Sep. 3, 2014

(65) Prior Publication Data

US 2015/0061317 A1   Mar. 5, 2015

Related U.S. Application Data

(60) Provisional application No. 61/873,152, filed on Sep. 3, 2013.

(51) Int. Cl.
*B60P 3/34* (2006.01)

(52) U.S. Cl.
CPC ..................... *B60P 3/341* (2013.01)

(58) Field of Classification Search
CPC ............... B60P 3/34; B60P 3/341; B60P 3/39
USPC .......... 296/159, 165, 164, 168, 169, 170, 173
See application file for complete search history.

(56) References Cited

U.S. PATENT DOCUMENTS

| 2,640,721 | A | * | 6/1953 | Kors | 296/173 |
| 3,371,954 | A | * | 3/1968 | Larsson | 296/169 |
| 3,737,190 | A | * | 6/1973 | Smith et al. | 296/159 |
| 4,294,484 | A | * | 10/1981 | Robertson | 296/156 |
| 4,695,087 | A | * | 9/1987 | Hollrock | 296/14 |
| 5,988,731 | A | * | 11/1999 | Eischen | 296/159 |
| 6,712,422 | B1 | * | 3/2004 | Vaillancourt | 296/165 |
| 6,932,418 | B1 | * | 8/2005 | Connell | 296/161 |
| 2008/0088146 | A1 | * | 4/2008 | Newman | 296/26.15 |

* cited by examiner

*Primary Examiner* — Jason S Morrow
(74) *Attorney, Agent, or Firm* — Michael F. Krieger; Kirton McConkie

(57) ABSTRACT

A convertible utility/camper unit for use in a trailer, truck bed, or other similarly shaped vehicle. The convertible unit is separate from the trailer or truck thereby allowing the convertible unit to be used in virtually any utility trailer or truck. The convertible unit comprises a frame and supports which can be placed in multiple positions to allow the unit to serve as a utility trailer or a camper.

18 Claims, 23 Drawing Sheets

CONVERTIBLE UTILITY/CAMPER UNIT FOR USE IN TRAILER OR TRUCK BED

CROSS-REFERENCE TO RELATED APPLICATIONS

This application claims the benefit of U.S. Provisional Patent Application No. 61/873,152 which was filed on Sep. 3, 2013.

BACKGROUND

U.S. Pat. Nos. 7,159,893 and 7,165,779 disclose a convertible combination utility/camper tow trailer. The trailer disclosed in these patents can be used as a utility trailer for hauling camping gear, ATVs, or other camping equipment and then converted into a camper. To allow the trailer to be converted, two sidewall supports are pivotally attached to the frame of the trailer to allow the sidewall supports to be moved between different positions to provide the intended function.

BRIEF SUMMARY

The present invention extends to a convertible utility/camper unit for use in a trailer, truck bed, or other similarly shaped vehicle. The convertible unit is separate from the trailer or truck thereby allowing the convertible unit to be used in virtually any utility trailer or truck. The convertible unit comprises a frame and side supports which can be placed in multiple positions to convert the unit for a particular use.

When the side supports are placed on top of the frame, the side supports form a surface on top of which items such as camping gear or ATVs can be placed. In this configuration, the side supports also enclose an area within the frame within which a tent can be stored. When the side supports are attached to the frame in a vertical direction, the side supports form sidewalls to increase the effective volume of the utility trailer. When the side supports are attached to the frame in a horizontal and outwardly extending direction, the side supports form a bed or seat surface for a tent which can be pitched within the frame.

In one embodiment, the present invention is implemented as a convertible utility/camper unit comprising a frame shaped to be placed on top of or inside a trailer or inside a bed of a truck; and a pair of side supports that are configured to be stored on top of the frame and to be connected to the frame in an outwardly extending horizontal position such that, when the side supports are connected to the frame in the horizontal position, each side support forms a bed area for a tent pitched within the frame.

In another embodiment, the present invention is implemented as a convertible utility/camper unit. The unit includes a rectangular frame having wings extending from a top surface of opposing sides of the frame. The frame is shaped to be placed on top of or inside a trailer or inside the bed of a truck. The unit also includes a pair of side supports independent of the frame. Each side support is configured to be attached to a corresponding wing in a horizontal and a vertical position. Each side support is also configured to be stored on top of the frame in a horizontal position such that the side supports form a surface on top of which items can be stored for transport when the unit is used on a trailer or in the bed of a truck.

In another embodiment, the present invention is implemented as a convertible utility/camper unit. The unit comprises a frame having wings extending from a top surface of opposing sides of the frame. The frame is shaped to be placed on top of or inside a trailer or inside the bed of a truck. The unit also includes a pair of side supports independent of the frame. Each side support is attachable to a corresponding wing in a horizontal and a vertical position. The unit further includes one or more support bars on which the side supports are stored when not in the horizontal or vertical position.

This summary is provided to introduce a selection of concepts in a simplified form that are further described below in the Detailed Description. This Summary is not intended to identify key features or essential features of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
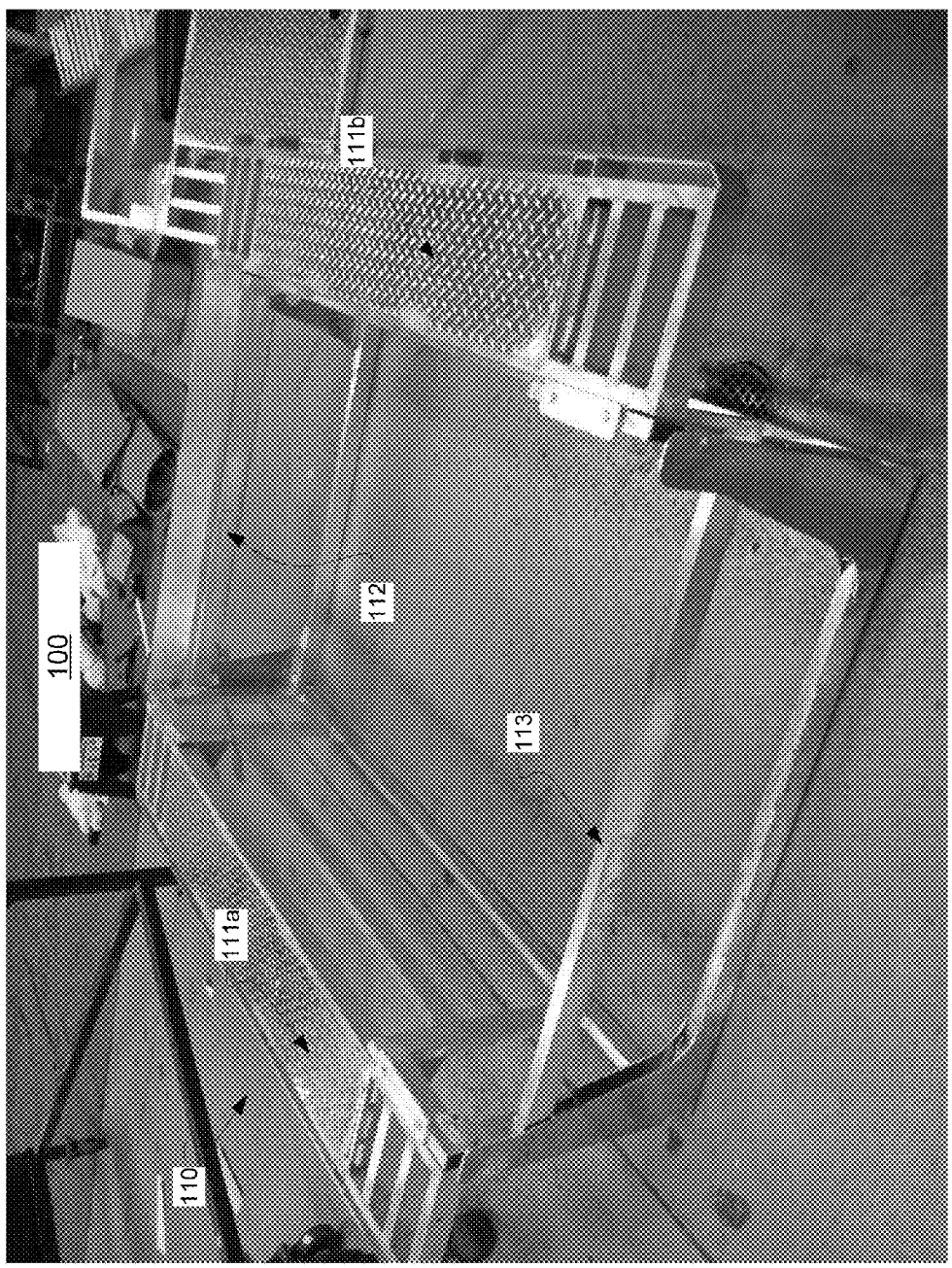
FIGS. 1A and 1B illustrate a frame of a convertible utility/camper unit.
Figure 1B:

FIGS. 1A and 1B illustrate a frame 110 of a convertible unit 100 when the convertible unit is not placed on a trailer, truck, or other vehicle. As shown, frame 110 has a generally rectangular shape with wings 111a, 111b extending from each side. Two support bars 112, 113, one of which is removable (113), extend between the two sides of frame 110.

Figure 2:
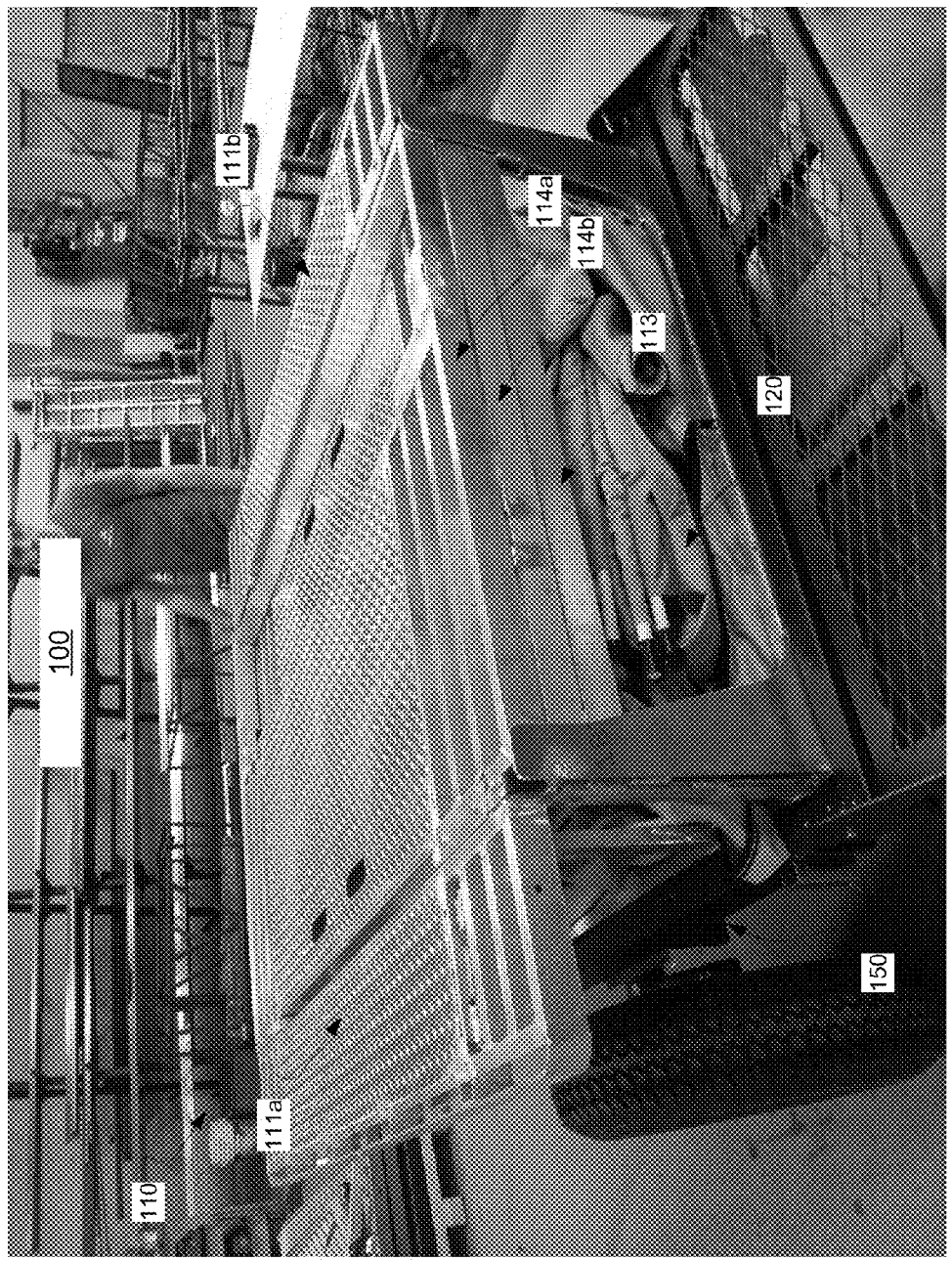
FIG. 2 illustrates the convertible utility/camper unit when placed on a trailer.

FIG. 2 illustrates convertible unit 100 when placed on a trailer 150. FIG. 2 also illustrates two side supports 114a, 114b that are placed on top of frame 110. As shown, side supports 114a, 114b rest on top of support bars 112, 113. Support bars 112, 113 can be positioned so that the top surface of the top side support (e.g., 114a) is level with the top surface of wings 111a, 111b. In this configuration, convertible unit 100 can be used as a utility trailer by placing items on top of the unit. For example, camping gear, an ATV, or virtually any other item can be placed on the top surface of side support 114a and wings 111a, 111b to allow for transport of the items. FIG. 2 also shows a tent 120 that is contained within frame 110 underneath side supports 114a, 114b. Other items, instead of tent 120, could also be contained within frame 110.

Although FIG. 2 shows unit 100 being placed on a trailer, due to the design of frame 110, unit 100 can be placed in the bed of a truck and used in the same configuration shown in FIG. 2 to transport items. In particular, wings 111a, 111b are positioned at a sufficient height so that the wings would extend out over top of the sides of a truck bed. Accordingly, unit 100 can be placed in a truck bed and be used in a similar manner as shown in the figures.

Figure 3A:
FIGS. 3A-3G illustrate how the side supports can be repositioned to convert the unit into a camper.
Figure 3B:
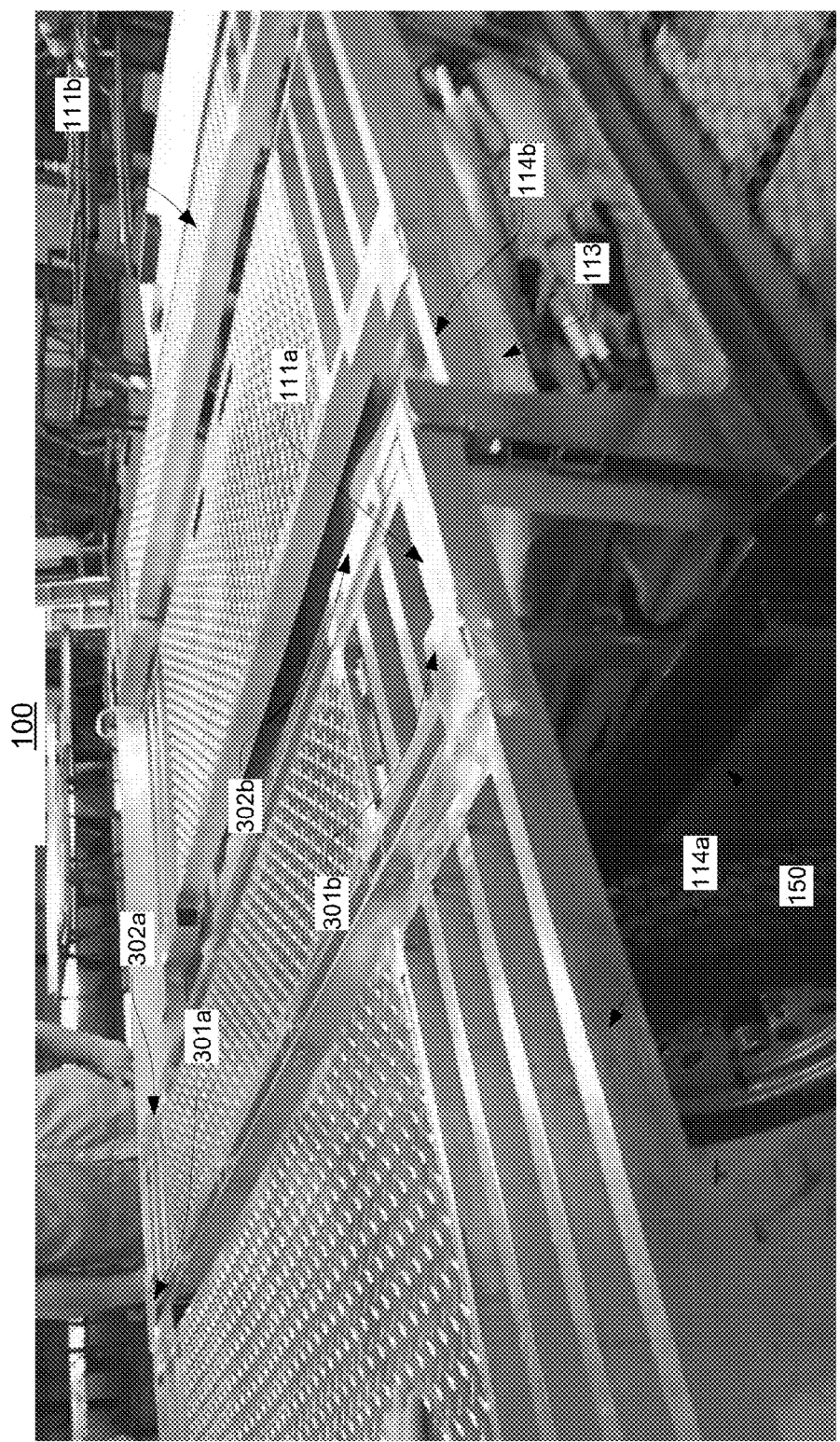

FIGS. 3A-3G illustrate how side supports 114a, 114b can be repositioned to convert unit 100 into a camper. In FIG. 3A, side support 114a is shown as being lifted off of side support 114b. In FIG. 3B, side support 114a has been placed in an outwardly extending horizontal position. Side supports 114a, 114b are shaped and sized so that a portion of the side supports extend around wings 111a, 111b respectively.

To secure side support 114a in this extended horizontal position, side support 114a includes two support tabs 301a, 301b positioned on a front and back portion of the support respectively. Frame 110 also includes two support tabs 302a, 302b positioned near a front and a back of the frame respectively. Support tabs 301a, 301b, 302a, 302b hold side support 114a in this horizontal position. As shown in more detail in FIG. 3F, support tabs 301a, 301b rest on top of wing 111a and prevent side support 114a from moving downward passed the position shown in FIG. 3B. Similarly, as shown in more detail in FIG. 3G, support tabs 302a, 302b are positioned overtop side support 114a (i.e., the inner beam of side support 114a is positioned underneath support tabs 302a, 302b) to prevent side support 114a from moving upward beyond support tabs 302a, 302b. In this way, side support 114a can be formed as a separate component from frame 110 while still providing the necessary strength to support weight in the horizontal position.

Figure 3C:
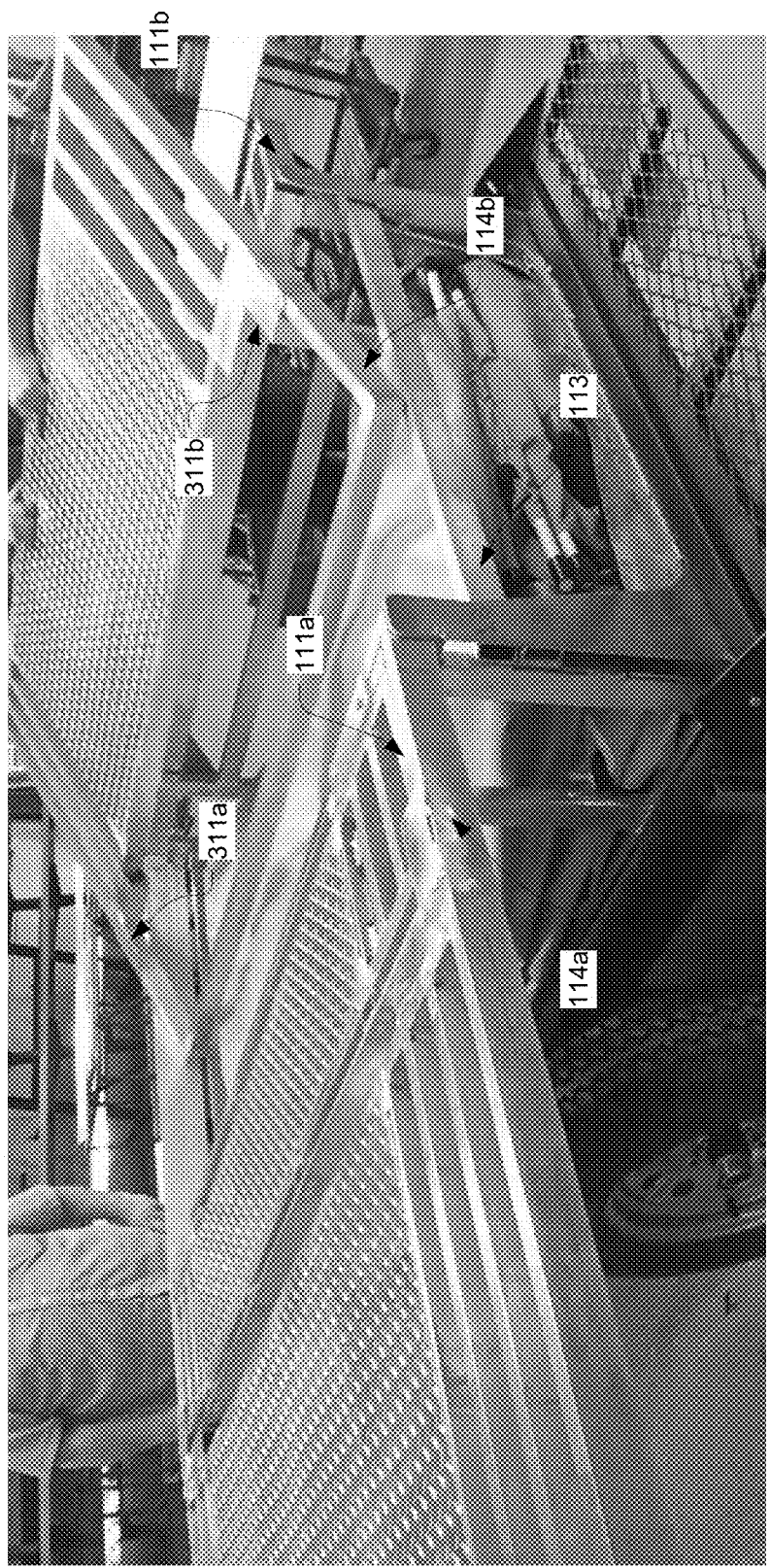
Figure 3D:
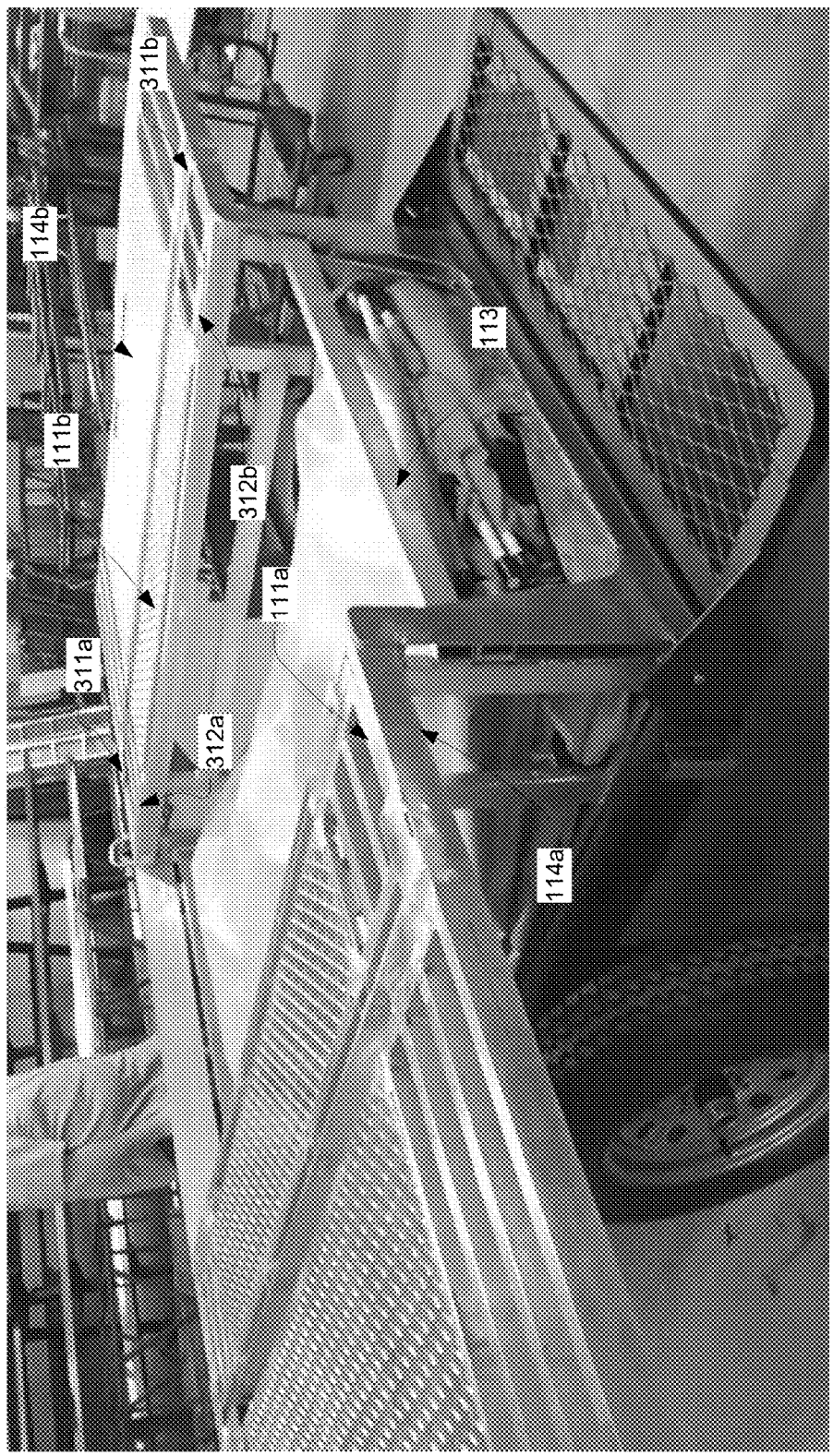
Figure 3E:
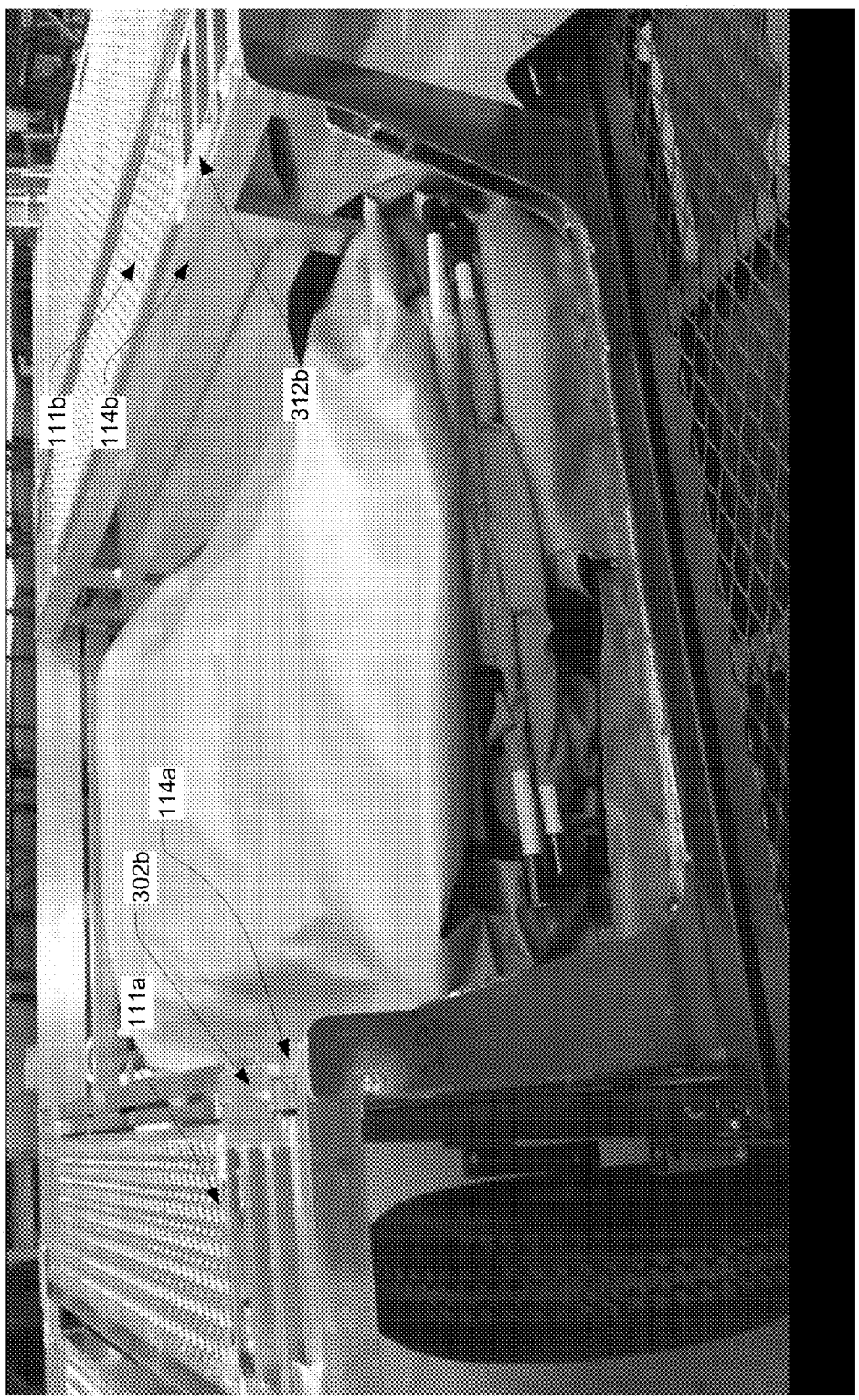
Figure 3F:
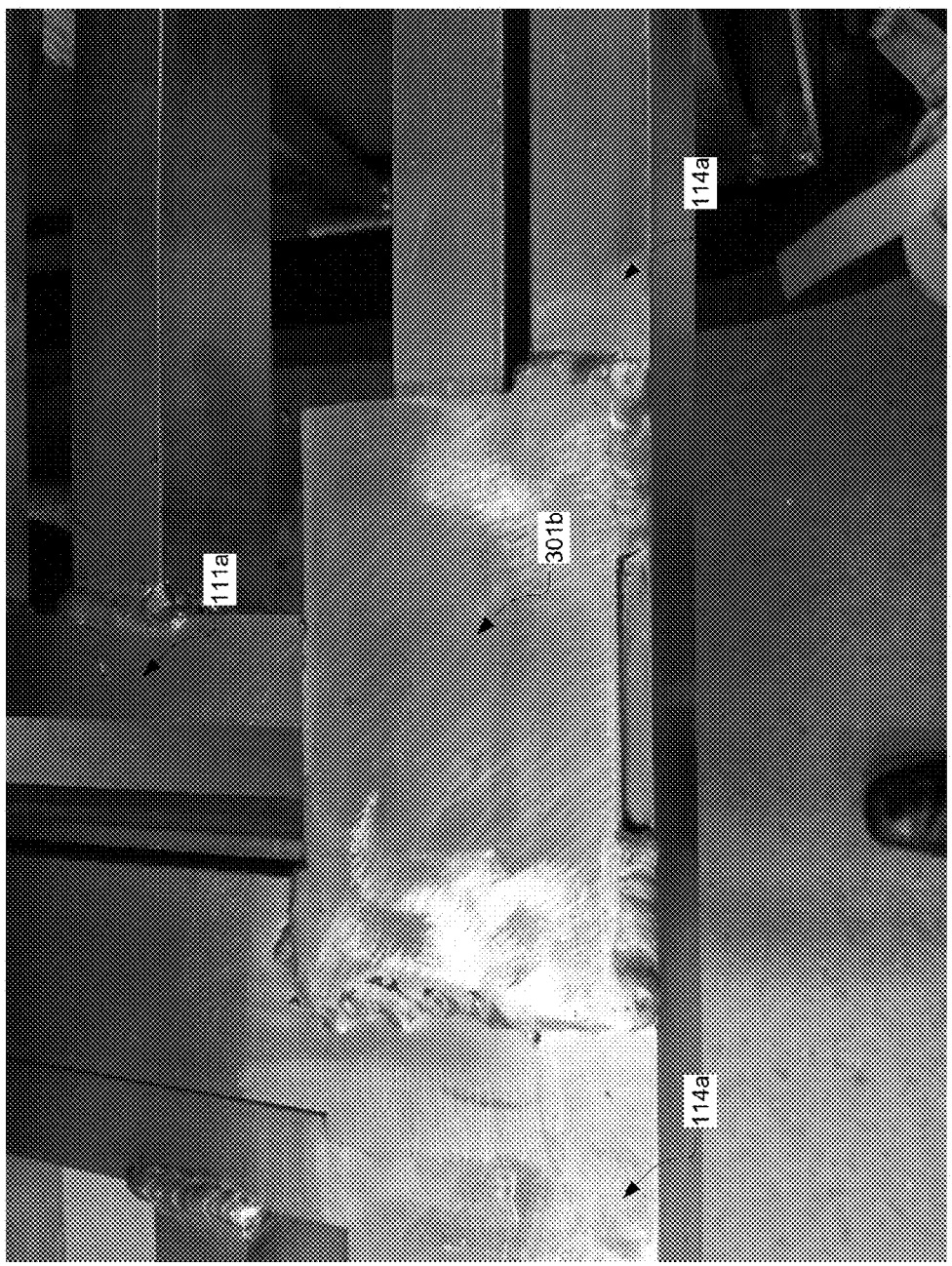
Figure 3G:
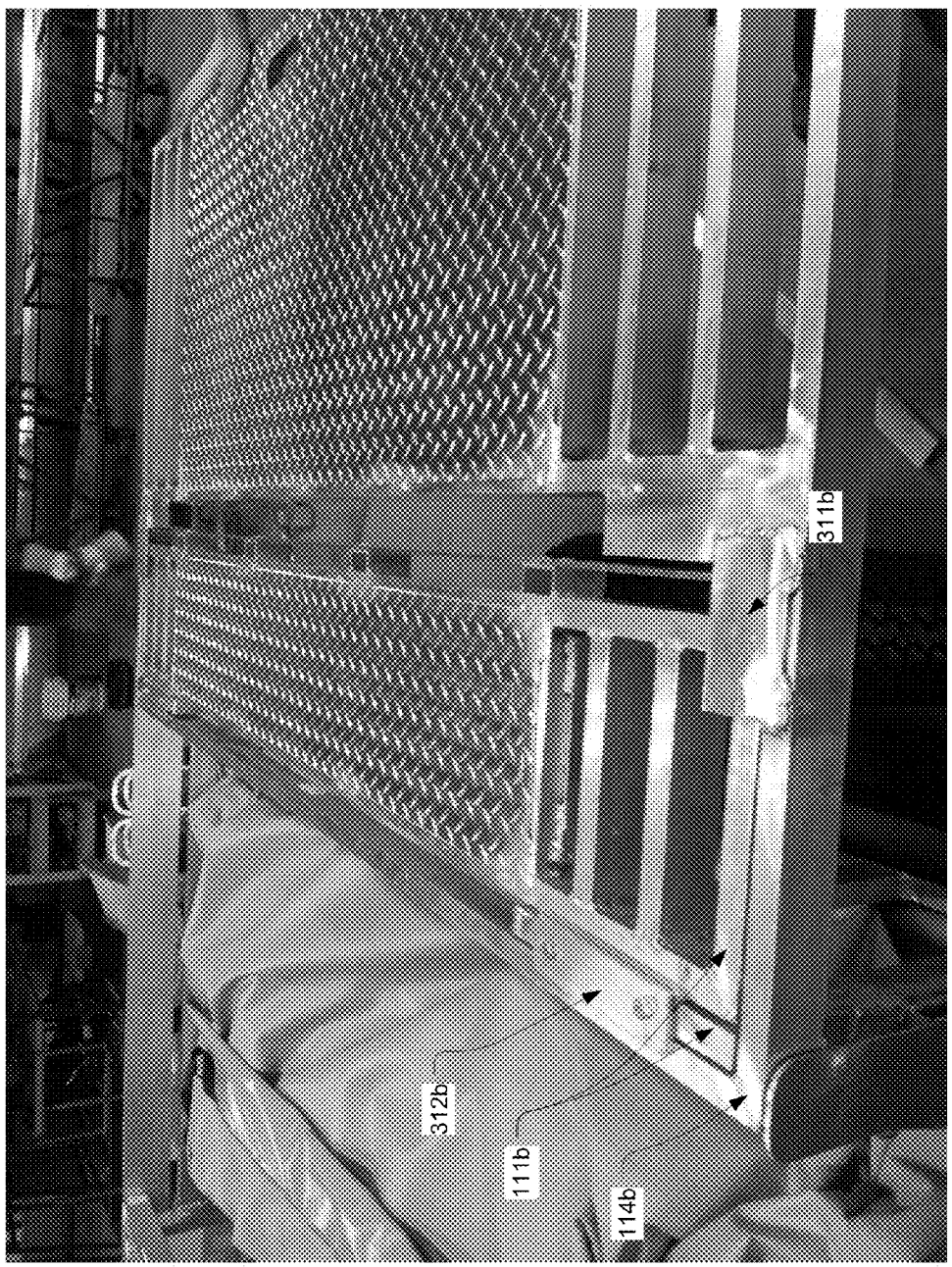

FIGS. 3C and 3D illustrate how side support 114b can also be extended from wing 111b in a horizontal position in the same manner as side support 114a is extended from wing 111a. FIG. 3C shows side support 114b as it is being lifted towards wing 111b. FIG. 3C also illustrates support tabs 311a, 311b which are formed on side support 114b and correspond to support tabs 301a, 301b formed on side support 114a (i.e., side supports 114a and 114b can be interchangeable). FIG. 3D illustrates side support 114b once it has been positioned in the extended horizontal position. Once in this position, support tabs 311a, 311b on side support 114a and support tabs 312a, 312b maintain side support 114b in the horizontal position as described above with respect to side support 114a. FIG. 3E illustrates that support bar 313 has been removed to provide an opening into frame 110.

Figure 4A:
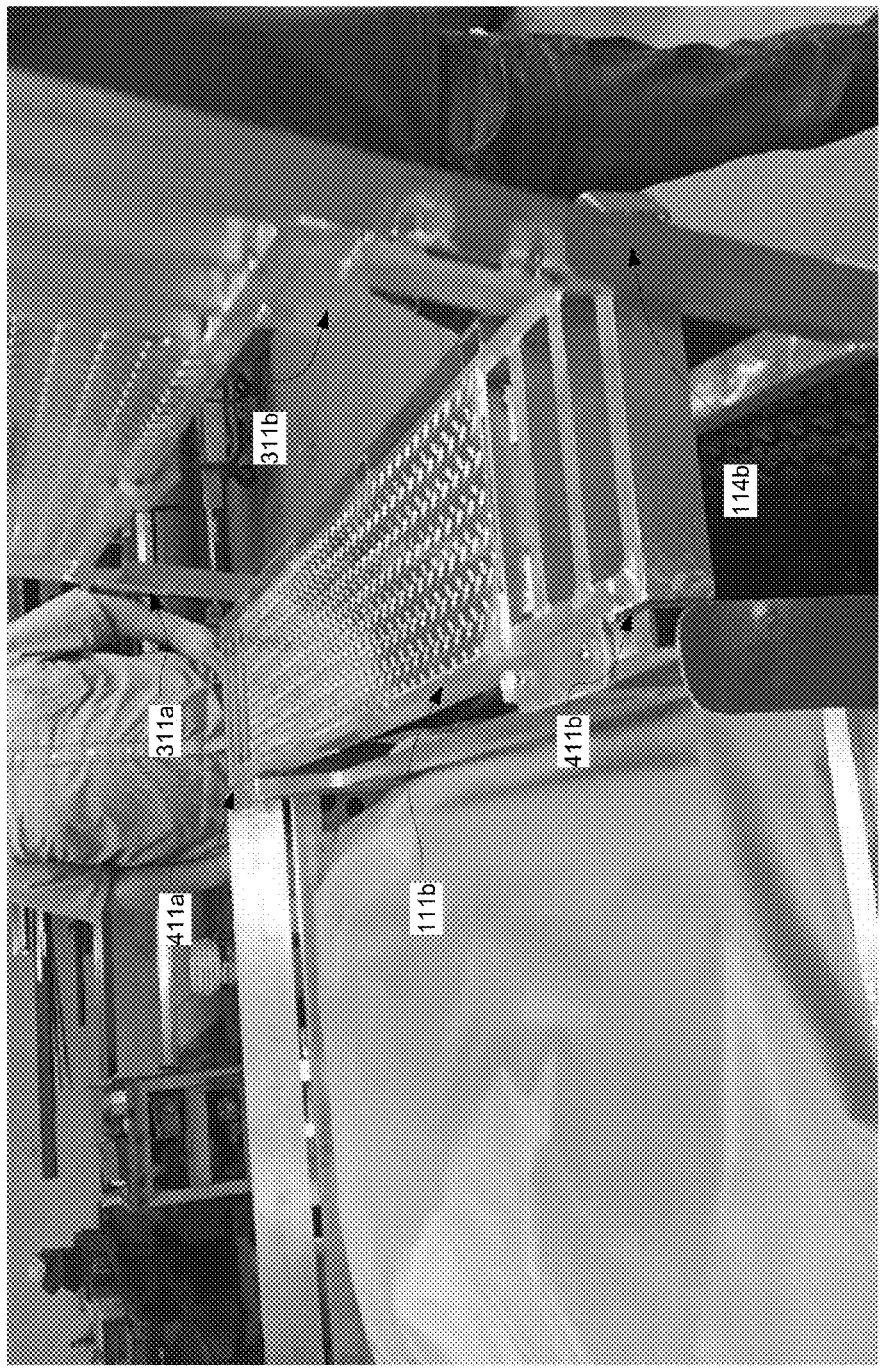
FIGS. 4A-4D illustrate how the side supports can be reconfigured into a vertical position.
Figure 4B:
Figure 4C:
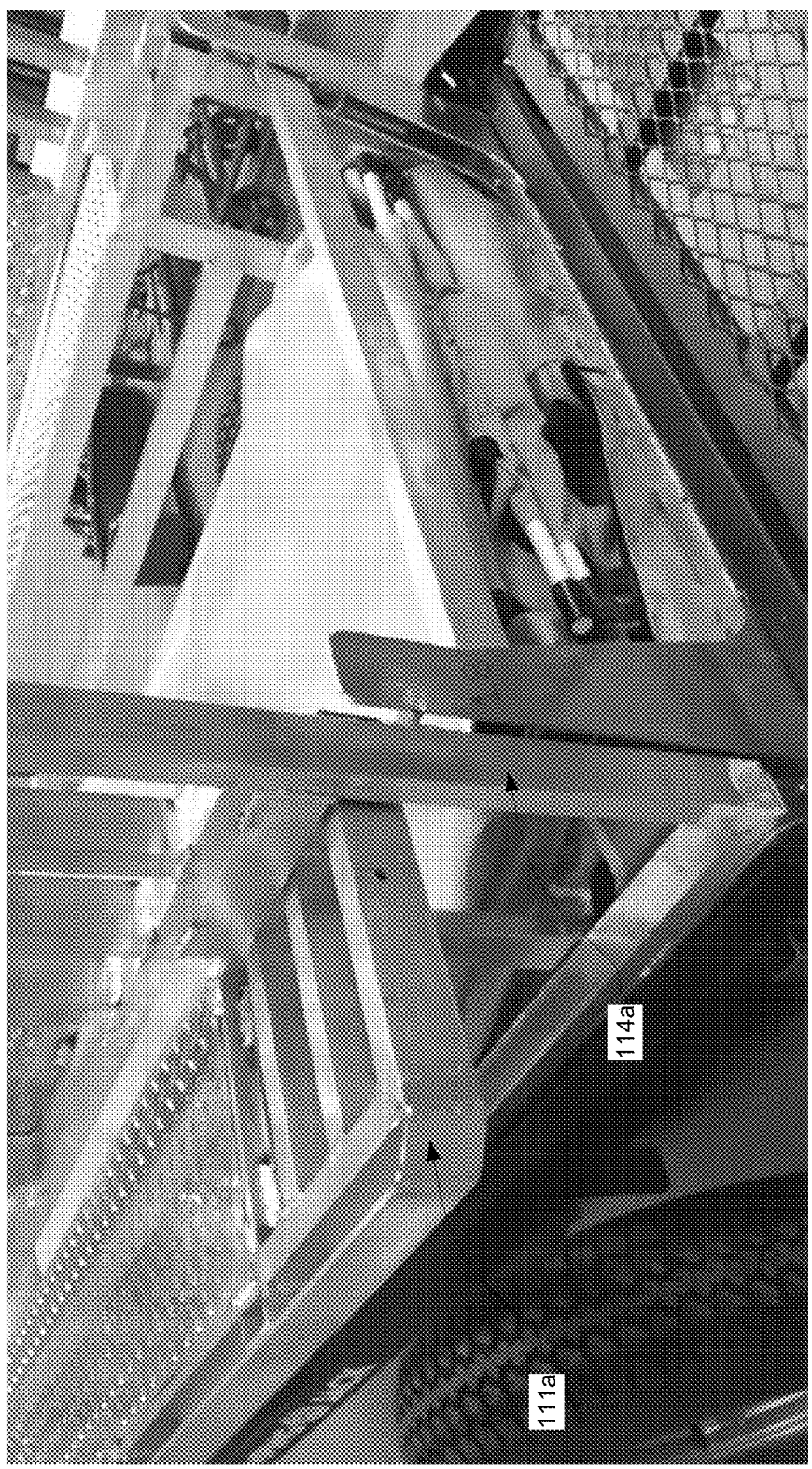
Figure 4D:
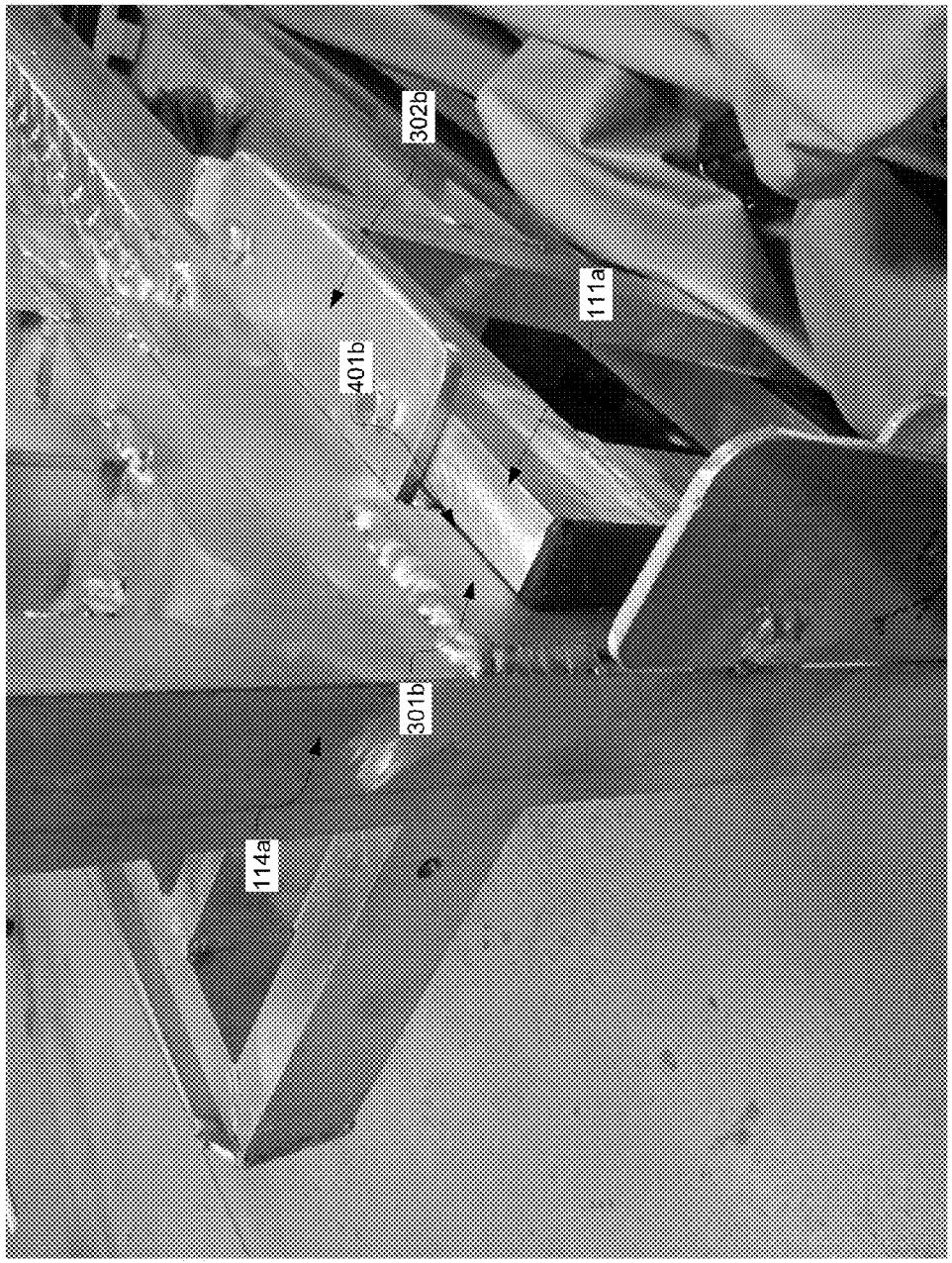

FIGS. 4A-4D illustrate how side supports 114a, 114b can be reconfigured into a vertical position. As shown in FIG. 4A, to place side support 114b in the vertical position, side support 114b is first placed around wing 111b and then support tabs 311a, 311b are inserted into gaps 411a, 411b formed between the body of frame 110 and wing 111b. FIG. 4B illustrates that support tabs 311a, 311b have been inserted into gaps 411a, 411b thereby securing side support 114b in the vertical position. FIG. 4C illustrates that side support 114a can be repositioned in a similar manner. FIG. 4D provides a more detailed view of how support tab 301b inserts into gap 401b to secure side support 114a in the vertical position.

Side supports 114a, 114b can be placed in the vertical position to increase the storage capacity of unit 100. For example, with the higher walls provided by side supports 114a, 114b, more items could be placed within unit 100 for transport.

Figure 5A:
FIGS. 5A and 5B illustrate how the unit can be used as a camper when the side supports are in the horizontal position.
Figure 5B:
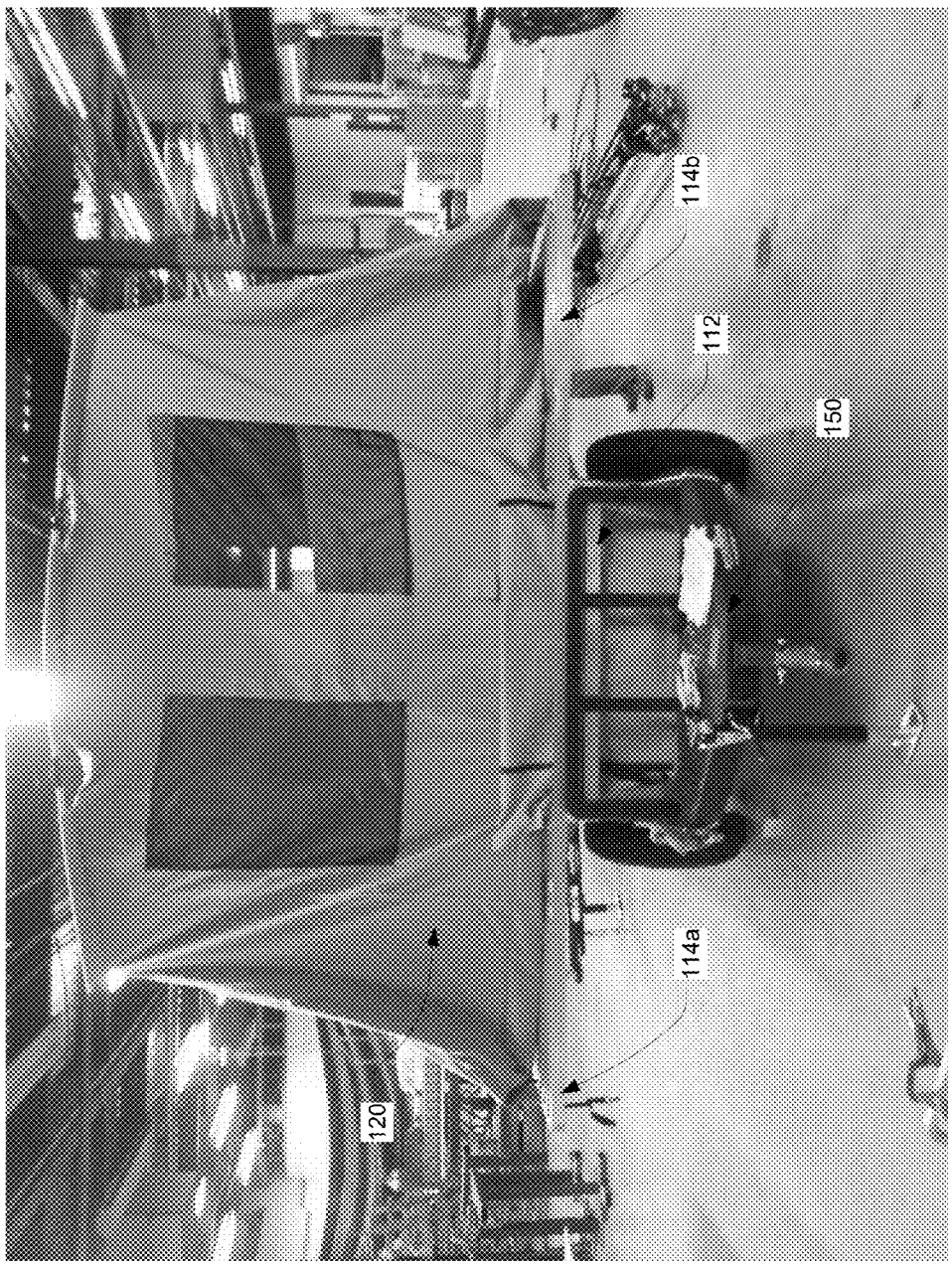

FIGS. 5A and 5B illustrate how unit 100 can be used as a camper when side supports 114a, 114b are in the horizontal position. FIG. 5A illustrates a front view while FIG. 5B illustrates a back view of unit 100. With side supports 114a, 114b in this position, tent 120 can be pitched within frame 110. The floor of a trailer 150 (or a truck) can be used to support the floor of tent 120. Side supports 114a, 114b as well as wings 111a, 111b act as supports for a bed or seat area of tent 120. For example, as shown in FIGS. 5A and 5B, tent 120 can extend over top of side supports 114a, 114b to provide two bed areas.

Figure 6A:
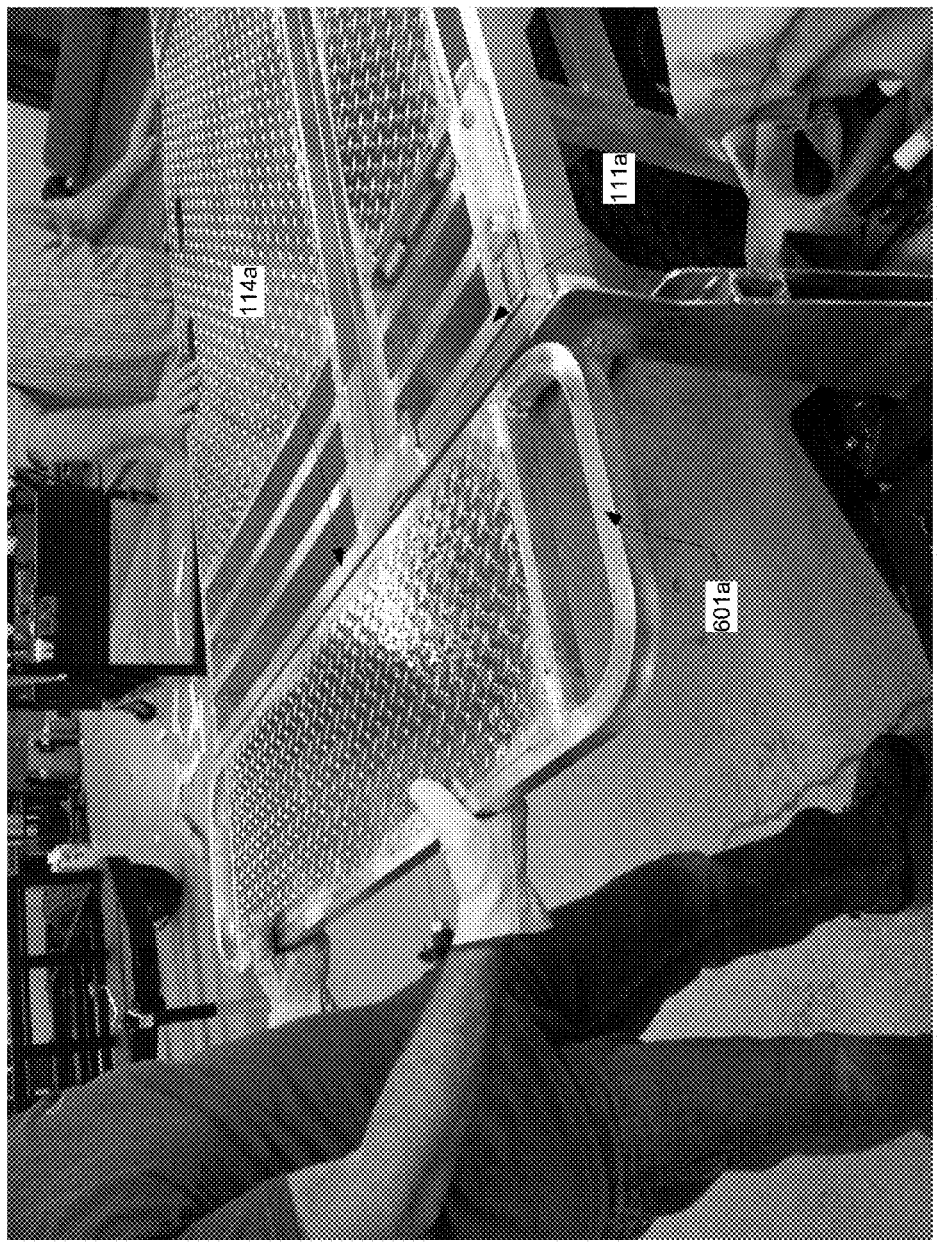
FIG. 6A illustrates how a side extension can be used to extend the bed area when the unit is used as a camper.

In some embodiments, unit 100 can include one or more side extensions. As shown in FIG. 6A, a side extension 601a can be configured to attach to the end of a side support (such as side support 114a as shown) to effectively lengthen the side support when in the horizontal position. In this way, the length of the bed area can be extended. For example, in some embodiments, unit 100 (including side supports 114a, 114b) can have a length of six feet. In such cases, the side extensions can be provided to create a bed area having a length of eight feet (e.g., when side extension 601a has a width of two feet). In these embodiments, tent 120 can be configured so that the portions of the tent forming the bed area conform to the extended length.

Figure 6B:
FIGS. 6B-6D illustrate how the side extensions can be attached between the side supports.
Figure 6C:
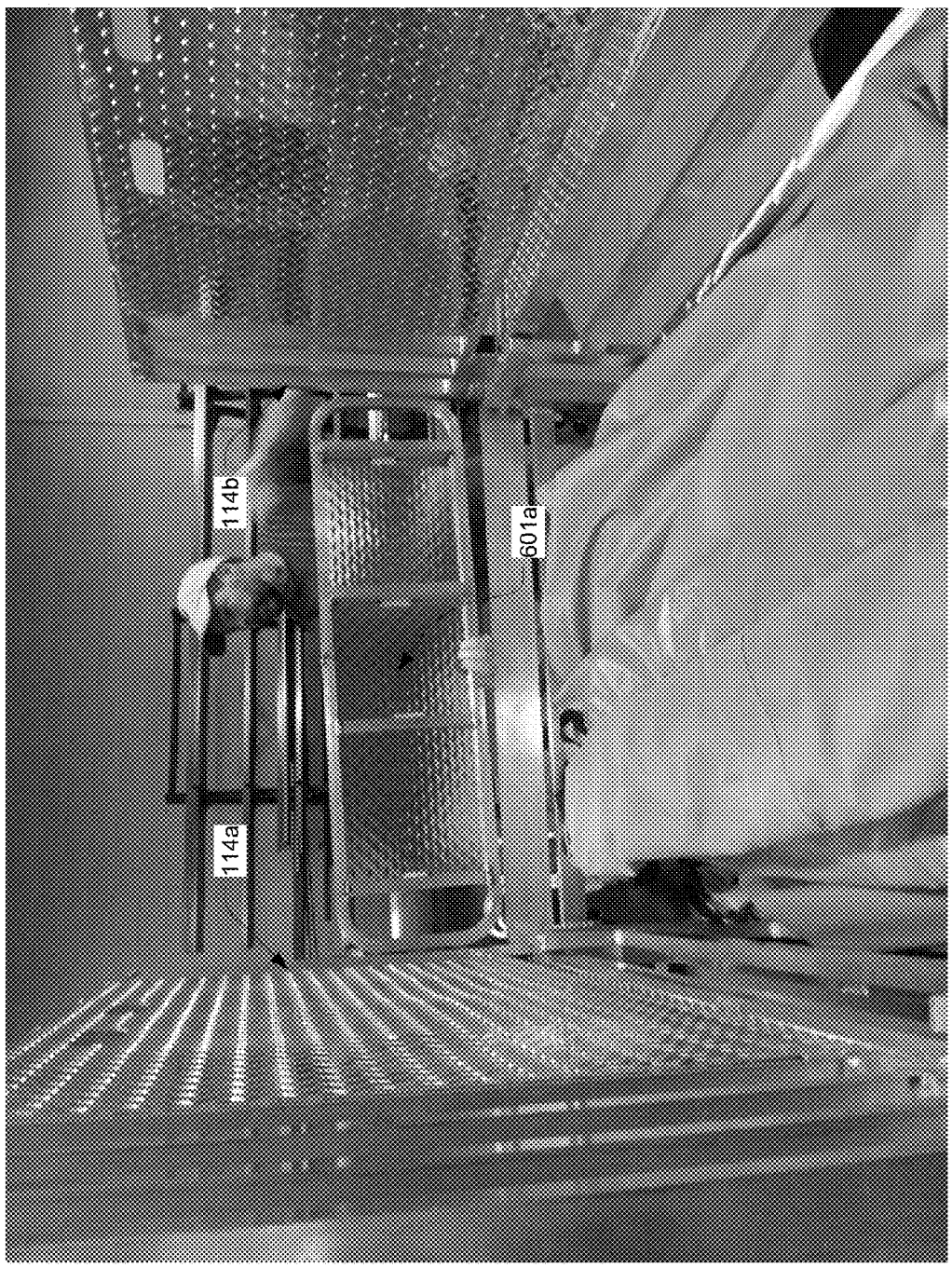
Figure 6D:

In embodiments that include side extensions, unit 100 can be configured to allow the side extensions to attach to the side supports when the side supports are in the vertical position. As shown in FIGS. 6B and 6C, side extension 601a can attach between the vertically positioned side supports 114a, 114b to form a front wall for the utility trailer. Although not shown, a side extension can simultaneously be positioned in each of the positions shown in FIGS. 6B and 6C to form a complete front wall. Alternatively, as shown in FIG. 6D, one or more side extensions (e.g., side extension 601a) can be attached between the vertically positioned side supports 114a, 114b to form supports on top of which items can be placed. For example, in this configuration a boat or other longer item can be placed on top of the side extensions.

Figure 6E:
FIG. 6E illustrates how the side extensions can be stored.

FIG. 6E illustrates how side extensions 601a, 601b can be stored when side supports 114a, 114b are positioned on top of support bars 112, 113. As shown, there is a gap between the beams of side support 114a (which is the same gap within which wing 111a is positioned when side support 114a is in the horizontal position). Side extensions 601a, 601b can be placed within this gap. Side extensions 601a, 601b can also be sized and configured so that the top surface of the top side extension (which in FIG. 6E is side extension 601a) is level with the top surface of the top side support (which in FIG. 6E is side support 114a) and wing 111b (or wing 111a if the orientations were reversed).

As shown in FIGS. 6A-6E, side extensions 601a, 601b and side supports 114a, 114b can have the same width. Additionally, this width can correspond with the distance between wings 111a, 111b to enable side extensions 601a, 601b to be connected between the vertically positioned side supports. However, the present invention also extends to embodiments where the side extensions have a different width than the side supports.

Figure 7:
FIG. 7 illustrates a trailer with a tent after the configurable unit has been removed.

Because unit 100 is a separate unit from the trailer (or truck), it can be easily removed. To facilitate removal of unit 100, in some embodiments (such as shown in FIGS. 1A and 1B, unit 100 does not include a floor. In such cases, unit 100 can be lifted off the trailer without removing the tent. FIG. 7 illustrates a trailer 150 with a tent 120 after unit 100 has been removed. In some embodiments, unit 100 can be made of aluminum or other light-weight metal so that the unit can be removed by a single person.

Figure 8:
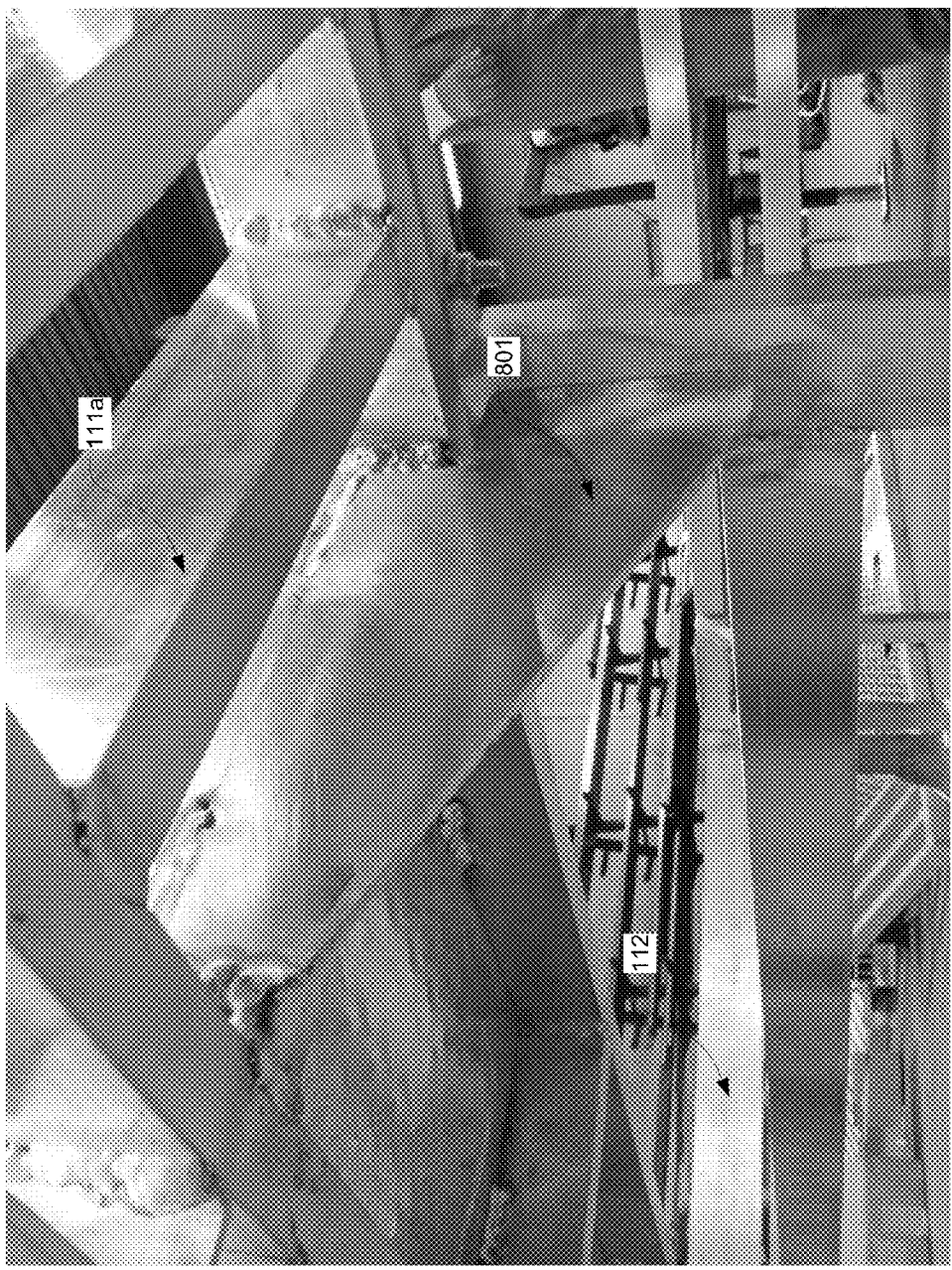
FIG. 8 illustrates an angled support that can be used to support the wing from the frame body.

After the unit has been removed, the tent can also be removed leaving a trailer (or truck) that can be used for another purpose. Although the trailer in FIG. 7 does not include sidewalls, the configurable unit could also be used on a trailer with sidewalls in the same manner described above. For example, FIG. 8 illustrates a view of the underside of wing 111a according to one or more embodiments of the invention. An angled support 801 is designed to have a clearance sufficient to allow unit 100 to be used on most utility trailers or truck beds. Of course, if unit 100 were desired to be used on a trailer having unusually high sidewalls, angled support 801 could be replaced with another supporting structure or otherwise adjusted to allow the unit to conform to the trailer's dimensions. Accordingly, a unit in accordance with one or more embodiments of the present invention can be used with virtually any type of trailer without requiring modification to the trailer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A convertible utility/camper unit comprising:
   a frame shaped to be placed on top of or inside a trailer or inside a bed of a truck;
   a pair of side supports that are configured to be stored on top of the frame and to be connected to the frame in an outwardly extending horizontal position such that, when the side supports are connected to the frame in the horizontal position, each side support forms a bed area for a tent pitched within the frame wings on opposing sides of the frame; and
   wherein the side supports interlock with the wings to secure the side supports in the horizontal position.

2. The unit of claim 1, wherein the side supports are configured to be connected to the wings in a vertical position.

3. The unit of claim 2, wherein each side support is connected to a corresponding wing by inserting a support tab of the side support into a gap formed between the wing and the frame.

4. The unit of claim 1, wherein the frame has an open bottom such that the frame can be lifted off a trailer or truck without removing items positioned within the frame.

5. The unit of claim 1, further comprising:
   side extensions that attach to the side supports for extending the effective length of the bed areas.

6. The unit of claim 5, wherein the side extensions are configured to attach in a vertical position between the side supports when the side supports are connected to the frame.

7. The unit of claim 1, wherein the frame comprises one or more support bars that extend between opposing sides of the frame.

8. The unit of claim 7, wherein the top surface of the frame comprises a top surface of wings on opposing sides of the frame.

9. A convertible utility/camper unit comprising:
   a rectangular frame having wings extending from a top surface of opposing sides of the frame, the frame being shaped to be placed on top of or inside a trailer or inside the bed of a truck;
   a pair of side supports independent of the frame;
   wherein each side support is configured to be attached to a corresponding wing in a horizontal and a vertical position; and
   wherein each side support is configured to be stored on top of the frame in a horizontal position such that the side supports form a surface on top of which items can be stored for transport when the unit is used on a trailer or in the bed of a truck.

10. The unit of claim 9, wherein each side support comprises a sub frame and includes one or more support tabs that extend inwardly from the sub frame.

11. The unit of claim 10, wherein each wing includes one or more support tabs that extend inwardly from the wings into an interior of the sub frame.

12. The unit of claim 11, wherein each side support is attached to a corresponding wing in the horizontal position by placing a side of the sub frame of the side support underneath the one or more support tabs extending from the wing.

13. The unit of claim 12, wherein when the side of the sub frame of the side support is placed underneath the one or more support tabs, the one or more support tabs of the side support contact an upper surface of the wing to limit the downward movement of the side support with respect to the wing.

14. The unit of claim 13, wherein the one or more support tabs of the side support are inserted into a gap between the corresponding wing and the frame of the unit to place the side support in the vertical position.

15. A convertible utility/camper unit comprising:
   a frame having wings extending from a top surface of opposing sides of the frame, the frame being shaped to be placed on top of or inside a trailer or inside the bed of a truck;
   a pair of side supports independent of the frame, each side support being attachable to a corresponding wing in a horizontal and a vertical position; and
   one or more support bars on which the side supports are stored when not in the horizontal or vertical position.

16. The unit of claim 15, wherein the one or more support bars are positioned relative to a top surface of the wings such that when the side supports are stored on the one or more support bars, a top surface of a top side support is level with the top surface of the wings.

17. The unit of claim 15, further comprising:
   one or more side extensions that attach to the side supports, the one or more side extensions being shaped and sized to fit within a gap formed within one of the side supports when the side support is stored on the one or more support bars.

18. The unit of claim 15, wherein each wing includes one or more support tabs for supporting a corresponding side support in the horizontal position.

* * * * *